UNITED STATES PATENT OFFICE.

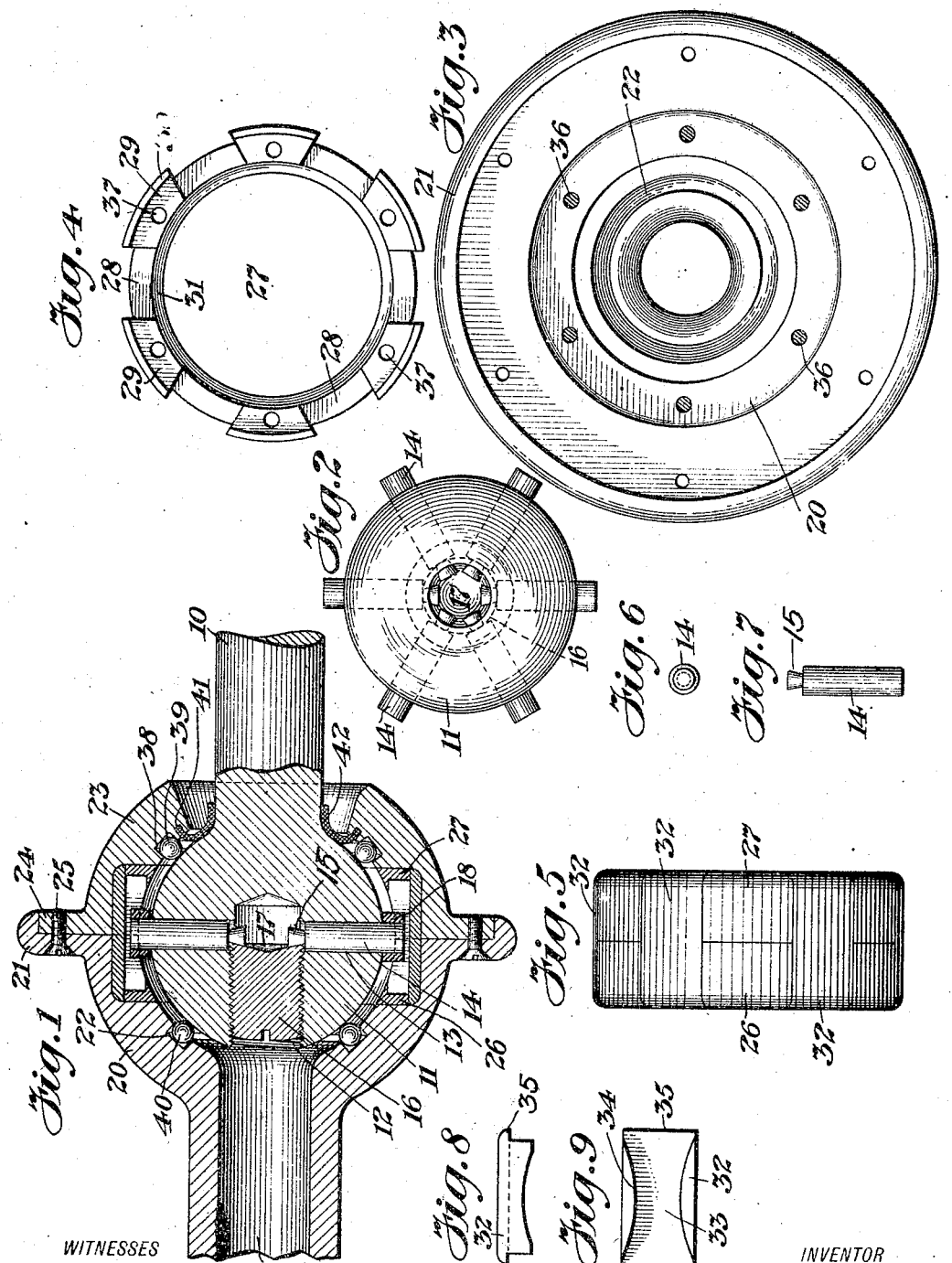

EUGENE P. EDWARDS, OF PLAINFIELD, NEW JERSEY, ASSIGNOR OF ONE-HALF TO HIMSELF AND ONE-HALF TO A. S. GILES, OF PLAINFIELD, NEW JERSEY.

UNIVERSAL JOINT.

1,136,466.

Specification of Letters Patent. Patented Apr. 20, 1915.

Application filed May 12, 1914. Serial No. 837,968.

*To all whom it may concern:*

Be it known that I, EUGENE P. EDWARDS, a citizen of the United States, residing at Plainfield, in the county of Union and State of New Jersey, have invented an Improvement in Universal Joints, of which the following is a specification.

I am aware that heretofore universal joints have been constructed so as to include a shaft with a ball head at its extremity fitting within a socket connected to another shaft, the said ball head being provided with a pin which projects at diametrically opposite points over its surface, and the projecting ends of the pin arranged to operate within recesses provided therefor in the said socket. In constructions of this kind, the pins change the direction of their oscillatory travel twice in each revolution of the shafts, in connection with which the joint is employed, and, due to the change in the direction of the travel of the pins, there is at the point where this change is made a hitch or jerky motion produced, which is oftentimes perceptible, particularly when the joint is used in motor vehicles.

The object of my present invention is to overcome this difficulty, and to provide a universal joint in which at least some of the members, through which the motion is transmitted from one shaft to the other, are always in operative engagement, so that at no point in the revolution of the shafts is there any jerky motion perceptible.

In carrying out my present invention, I preferably employ a shaft having a ball head at one end thereof, a socket adapted to be connected to the end of a second shaft, and to receive the ball head on the end of the aforesaid shaft, rings fitted within the said socket and also adapted to receive the said ball head, bearing members secured in spaced positions in the peripheries of the said rings, means for securing the said rings and bearing members in position within the said socket, a plurality of pins, means for securing the said pins in position in the said ball head, and rollers on the extremities of the said pins, each of which is adapted to enter and operate within a recess provided therefor in one of the said bearing members, as will hereinafter be more particularly described.

In the drawing, Figure 1 is a central longitudinal cross section of a universal joint made in accordance with my present invention. Fig. 2 is an end elevation showing the manner of securing the pins in the ball head at the end of one of the shafts. Fig. 3 is an end elevation of the socket member of the universal joint as shown in Fig. 1. Fig. 4 is a face view of one of the rings employed within the socket members. Fig. 5 is a side elevation of the rings and bearings employed in connection therewith, with these parts assembled. Fig. 6 is an end view of one of the pins. Fig. 7 is a side elevation of the same. Fig. 8 is a side elevation of one of the bearing members, and Fig. 9 is an inverted plan of the same.

Referring particularly to the drawing my improved universal joint preferably comprises a shaft 10, at one end of which there is a ball head 11. In alinement with the shaft 10, the head 11 is provided with a tapped opening 12, and in radial positions, preferably equi-distant and at right angles to the axis of the shaft 10, the ball head is provided with a plurality of bores 13, each adapted to receive a pin 14. At the inner end, each pin is tapered, as indicated at 15. These tapered ends of the pins 14 extend into the opening 12 and are adapted to be engaged by the inner end of a plug 16 turned down within the opening 12, the inner end of the plug 16 being provided with a recess 17, the surface of which is made at the same inclination as the sides of the tapered end portions of the pins, so that by turning the plug 16 into contact with these tapered end portions of the pins, the pins are maintained in their proper positions in the ball head 11. A portion of each pin 14 projects beyond the surface of the ball head 11, and on its projecting end each pin is provided with a roller 18. I also employ a sleeve 19, adapted in any suitable manner to be connected to the end of a second shaft. Secured to the sleeve 19 is a semi-spherical socket member 20. The semi-spherical socket member 20 is provided with a flange 21, and also interiorly with a circular recess 22. I also employ an annular socket member 23 provided with an opening through which the shaft 10 passes, and also with a flange 24 adapted to fit within the flange 21 on the semi-spherical socket member 20, so that these parts may be connected by screws or bolts 25 passed through the respective flanges thereof. I also employ a pair of similarly constructed ring members, indicated at 26 and 27. In equally spaced positions, in their peripheries, each of these ring members is provided with a series of recesses 28, corresponding in number with the number of pins 14 employed. The members 29 of these rings intermediate of the recesses 28 are, in one ring member, provided with flanges 30, and in the other ring member with recesses adapted to receive the flanges 30. Furthermore, each of these ring members is provided with a curved surface 31, the curvature of which corresponds to that of the surface of the ball head 11. I also employ a plurality of bearing members, each of which is indicated at 32. These bearing members correspond in number with the number of recesses 28 and pins 14.

Each bearing member 32 is provided with a recess 33, the opposite surface defining the same being curved, as indicated at 34. At opposite ends, each bearing member is provided with a flange 35. These bearing members are adapted to be received and fit within the recesses 28 after the ring members 26 and 27 have been placed in position, and the ring members, with their bearing members, are secured to the semi-spherical socket member 20 by means of screws 36, which pass through screw holes 37 provided in the said ring members 26 and 27, and into the semi-spherical socket member 20, it being understood that this socket member, together with the annular socket member, are suitably recessed to receive these parts. The annular socket member may also be provided with a circular recess 38, adapted to receive ball bearings 39, 40 representing a similar set of ball bearings, which may be placed within the circular recess 22 in the semi-spherical socket member 20. The annular socket member 23 may also be provided, adjacent the shaft hole or opening, with a circular recess 41, and into which a portion of a yielding washer, made of felt or other similar material, projects, this yielding washer being employed to exclude dust, dirt and grit from the usual working part of the joint.

In assembling the parts of the universal joint as hereinbefore described, the pins 14, with their rollers 18, are first fixed in position in the ball head 11 by turning the screw threaded plug 16 down to place. The ring member 27 is then passed over the shaft 10, and the ring member 26 placed over the ball head, and these ring members brought to their juxtaposed position. The bearing members 32 are then placed in the recesses 28, in the ring members, so that the rollers 18 lie within the recesses 33 in the bearing members. These parts are then placed in position within the semi-spherical socket member 20 and secured in place by turning down the screws 36. The annular socket member is then passed over the shaft 10, brought to position against the semi-spherical socket member, and the flanges of these socket members secured together by means of screws or bolts 25.

I claim as my invention:

1. A universal joint comprising a shaft, a ball head at the end thereof, a plurality of pins fixed in and projecting from the said ball head, a socket member, ring members within the said socket member, and a plurality of bearing members set within the said ring members, each bearing member being provided with a recess adapted to receive the end of one of the said pins and within which each said pin slides in the operation of the apparatus.

2. A universal joint comprising a shaft, a ball head at the end thereof, a plurality of pins projecting from the said ball head, a roller on the free end of each of the said pins, a socket member adapted to be connected to the end of a second shaft, a pair of ring members adapted to be received within the said socket, means for securing the said ring members in position within the said socket, and a plurality of bearing members set within the said ring members and each provided with a recess adapted to receive one of the said rollers and within which the said roller operates in the operation of the apparatus.

3. A universal joint comprising a shaft, a ball head at the end thereof provided with an opening in alinement with the said shaft, and with a plurality of radial bores at right angles to the axis of the said shaft, a pin placed within each of the said bores, means fitting within the said opening in the ball head for engaging the inner ends of the said pins to secure the same in position, a roller on the outer end of each of the said pins, a socket member adapted to be connected to the end of a second shaft, ring members within the said socket member, and a plurality of bearing members set within the said ring members, each bearing member being provided with a recess adapted to receive one of the said rollers.

4. A universal joint comprising a shaft, a ball head at one end thereof, a plurality of pins fixed in and projecting from the said ball head, a roller on the free end of each of the said pins, a semi-spherical socket member adapted to be connected to the second shaft, an annular socket member through which the said shaft passes, means for connecting the said socket members together, a pair of rings fitted within recesses provided therefor in the said socket members, and a plurality of bearing members set within recesses provided therefor in the peripheries of the said ring members, each bearing member being provided with a recess adapted to receive one of the said rollers.

5. A universal joint comprising a shaft, a ball head at the end thereof, the said ball head being provided with a tapped opening in alinement with the said shaft, and with a plurality of radially spaced bores at right angles to the axis of the said shaft, a pin within each of the said bores, a screw threaded plug adapted to be turned down within the said tapped opening to engage the inner ends of the said pins to maintain the same in position within the said ball head, a roller on the outer end of each of the said pins, a semi-spherical socket member adapted to be secured to a second shaft, an annular socket member, means for securing the said socket members together, a pair of rings fitted within recesses provided therefor in the said socket members, and a plurality of bearing members set within recesses provided therefor in the peripheries of the said ring members, each bearing member being provided with a recess adapted to receive one of the said rollers, and within which the same operates.

Signed by me this 10th day of January, 1914.

EUGENE P. EDWARDS.

Witnesses:
BERTHA M. ALLEN,
J. B. LE BLANC.